United States Patent [19]

Rossopoulos

[11] 3,988,741

[45] Oct. 26, 1976

[54] ELECTRODE FOR INK JET PRINTING

[75] Inventor: Stéphane Rossopoulos, Yverdon, Switzerland

[73] Assignee: Hermes Precisa International S.A., Yverdon, Switzerland

[22] Filed: Oct. 1, 1975

[21] Appl. No.: 618,364

[30] Foreign Application Priority Data

Oct. 7, 1974 Switzerland ....................... 13411/74

[52] U.S. Cl. .................................... 346/75; 29/592; 346/140 R

[51] Int. Cl.[2] ........................................ G01D 15/18

[58] Field of Search .............. 346/75, 140; 118/628, 118/638; 29/592

[56] References Cited

UNITED STATES PATENTS

| | | | |
|---|---|---|---|
| 3,319,318 | 5/1967 | Taimuty | 29/592 |
| 3,596,275 | 7/1971 | Sweet | 346/75 |

*Primary Examiner*—Joseph W. Hartary
*Attorney, Agent, or Firm*—Emory L. Groff, Jr.

[57] ABSTRACT

The electrode is composed of nine capillary tubes, tightly held in a square bundle by a casing, which covers the entire length of the tubes except for a portion next to the field forming ends of the tubes. The electrode is fabricated by placing the tubes into a piece of tubular stock, stretching the stock so as to squeeze it about the tubes to form the casing, cutting the resulting assembly into sections of the desired length, and removing that part of the casing next to the active face of the tubes.

7 Claims, 2 Drawing Figures

ELECTRODE FOR INK JET PRINTING

The invention relates to electrodes used in ink jet printing to form an electrostatic deflecting field for controlling the position of an ink jet issuing from a nozzle nose. The invention also relates to the method of making the electrodes.

In ink jet printing, drops of ink from the jet will deposit on the electrodes, thereby adversely affecting the printing.

It is known that the satisfactory operation of an ink jet printer is particularly dependent on the cleanliness of the electrodes.

In the prior art, there are electrodes that incorporate longitudinal slots that, by capillarity, remove the ink deposited on the active face of the electrode.

These electrodes are expensives to manufacture, as it is very costly to machine the capillary slots. The cost being all the more, because, if the electrodes are to operate as effectively as they should, a relatively large number of slots is required.

An object of the invention is an electrode that solves this problem in a simpler and less costly way.

In accordance with the invention, this object is attained by composing each electrode of a group of capillary tubes arranged side by side and having their mouths opposite the ink jet, and by surrounding the group over at least a part of the length thereof with an envelope, or casing, for tightly holding the group together.

A further object of the invention is a method for fabricating the electrode.

In accordance with the invention, this object is attained with the steps of inserting a number of tubes of small inner diameter into a length of tubular stock, stretching, or drawing, the tubular stock so as to cause it to shrink about the tubes to form therefor an envelope, or casing, that tightly holds the tubes in a bundle, cutting the resulting assembly into sections having the length desired for the electrode, truing at least that end of such section that is to be the active electrode face, and removing part of the length of the envelope at least in the immediate vicinity of the active electrode face.

Figure 1:
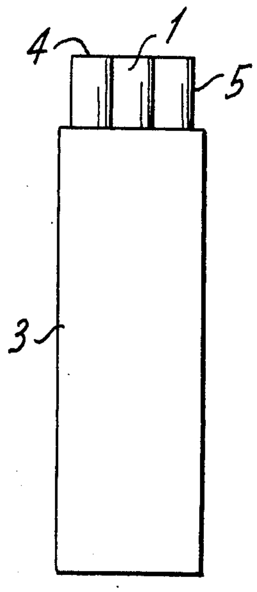
FIG. 1 is a side view of the electrode of the invention.
Figure 2:
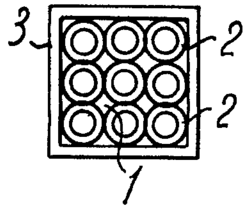
FIG. 2 is a top view of the electrode seen in FIG. 1.

With reference to the Figures, the electrode consists of a group 1 of capillary tubes 2, nine being shown, although it is to be understood that the invention also covers larger and smaller groups of capillary tubes. An envelope, or casing, 3, square in cross section, surrounds the nine tubes 2 and tightly holds them together. Although the electrode advantageously has a square cross section, as shown, the invention also comprises electrodes of other cross sectional shapes. The capillary tubes 2 are all of substantially the same length, and are so arranged that at one of their ends their mouths are coplanar to constitute the active planar surface, or face, 4 of the electrode, at which face is formed the deflecting electrostatic field.

The group 1, at the active surface 4 thereof, extends beyond the envelope 3 to expose a portion 5 of its lateral surface.

In accordance with the invention, the capillary tubes and the envelope preferably consist of two different materials. The tubes 2 can be made of nickel or brass, and the envelope of copper.

The method for fabricating the electrode of the invention is as follows.

Tubes 2 of small inner diameter are placed in a lenth of tubular stock that will comprise the envelope 3. The stock advantageously has a square cross section, and the inner diameter of the tubes 2 is sufficiently small so as to show capillarity with the printing ink used. Thereupon, the stock is stretched, or drawn, to form the envelope, or 3 that squeezes the tubes 2 into a tightly held group without noticeably crushing the tubes. The assembly thus constituted is next cut into sections of a length desired for the electrodes. Then, the end that will constitute the active electrode face 4 is trued. Finally, the part of the envelope next to the face 4 is removed so as to expose a lateral portion 5 of the tube group 1.

As previously remarked, the tubes and the envelope are advantageously composed of different materials : the tubes being of nickel or brass, for example, and the envelope of copper, thereby enabling a part of the envelope to be removed by a selective chemical or electrochemical attack.

The consequent electrode is inexpensive to manufacture as compared to known electrodes that have longitudinal slots. Moreover, because of the large number of capillary canals composed of the tubes 2 themselves and of the spaces between the tubes, the electrode of the invention very effectively eliminates the ink deposited on the active face 4 and on the lateral surface 5 next to this face.

Although the invention has been described and particularly shown with reference to the preferred embodiment, those skilled in the art will understand that the invention admits of changes in form and detail, aside from those already described, without exceeding the scope and spirit thereof.

I claim:

1. An electrode for creating a deflecting electrostatic field to control the position of an ink jet issuing from a nozzle nose in ink jet printing using a plurality of these electrodes, said electrode comprising a group of capillary tubes arranged side by side and having their mouths opposite the ink jet, and an envelope for surrounding said group over at least a part of the length thereof and for tightly holding together said group.

2. The electrode as defined in claim 1, wherein said mouths substantially define a common plane and constitute the active electrode face for forming the deflecting electrostatic field.

3. The electrode as defined in claim 2, wherein the end of said group of capillary tubes at said mouths thereof extends beyond said envelope, whereby a portion of the lateral surface of said group is exposed.

4. The electrode as defined in claim 3, wherein said capillary tubes are made of one material and said envelope is made of a different material.

5. The electrode as defined in claim 1, wherein said capillary tubes of a said group are nine in number and said group is square in cross section.

6. The electrode as defined in claim 1, wherein said capillary tubes are of such a cross sectional shape and size as to form between themselves in said group at least one space that shows capillarity for the printing ink used.

7. The electrode as defined in claim 6, wherein said capillary tubes are substantially round in cross section.

* * * * *